G. R. ADAMS.
BORING TOOL.
APPLICATION FILED DEC. 26, 1919.

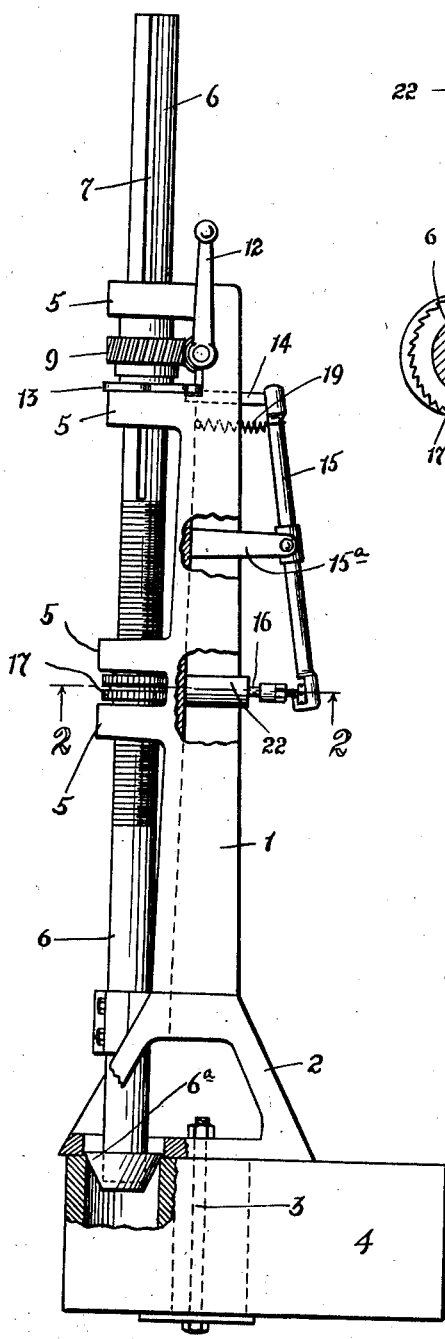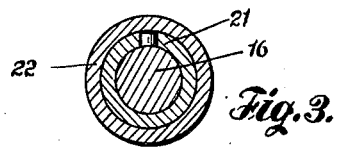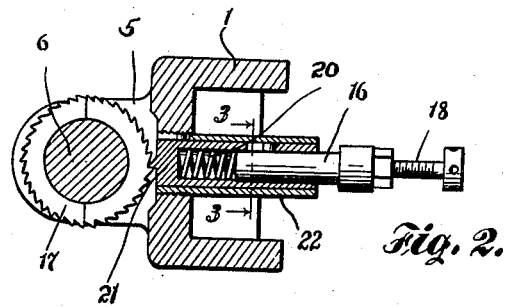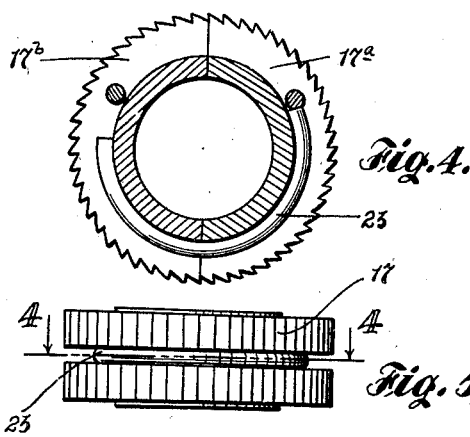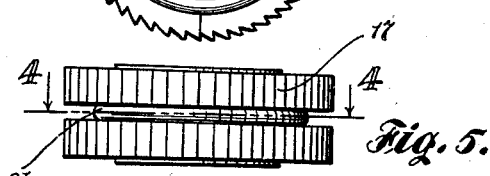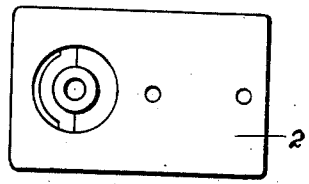

1,364,346.

Patented Jan. 4, 1921.
2 SHEETS—SHEET 2.

INVENTOR.
Geo. Reese Adams
BY John M. Spellman
ATTORNEY

UNITED STATES PATENT OFFICE.

GEORGE REESE ADAMS, OF HILLSBORO, TEXAS.

BORING-TOOL.

1,364,346. Specification of Letters Patent. Patented Jan. 4, 1921.

Application filed December 26, 1919. Serial No. 347,559.

*To all whom it may concern:*

Be it known that I, GEORGE REESE ADAMS, a citizen of the United States, residing at Hillsboro, in the county of Hill and State of Texas, have invented certain new and useful Improvements in Boring-Tools, of which the following is a specification.

My invention relates to improvements in boring tools and in such connection it relates more particularly to a tool of this description adapted to the boring of cylinders in internal combustion engines and the like.

The principal object of my invention is to provide a boring tool for boring scarred and worn engine cylinders, such tool being provided with means whereby the cutting or boring operation is adjustable to the diameter of the bore to be made and the depth of cut to be taken.

Another object lies in the arrangement of the adjustable ratchet feed. Other objects and advantages will become apparent as the description of the invention progresses.

In the carrying out of my invention I provide a boring bar disposed vertically in a suitable frame, and having a supporting base. The bar at its upper end is rotated by means of a worm gear arrangement in connection with a cam, rods and a ratchet wheel, the ratchet wheel controlling the vertical movement of the boring bar. The base of the frame is supported upon the top of the cylinder casing, being fastened preferably through one of the cylinders by a suitable bolt.

My invention will be more fully understood from the following description, taken in connection with the accompanying drawings forming part hereof, in which—

Figure 1 is a side elevational view of the boring tool attached to a block of engine cylinders and illustrating the manner of alining the boring bar to the center of the cylinder, the cylinder partly broken away.

Fig. 2 is a cross sectional view taken on line 2—2 of Fig. 1.

Fig. 3 is a partial cross sectional view of Fig. 2, taken on line 3—3 thereof.

Fig. 4 is a cross-sectional view of Fig. 5 in elevation and taken on line 4—4 thereof, Fig. 5 representing an edge view of the ratchet wheel.

Fig. 10 is a bottom view of the base.

Figure 6:
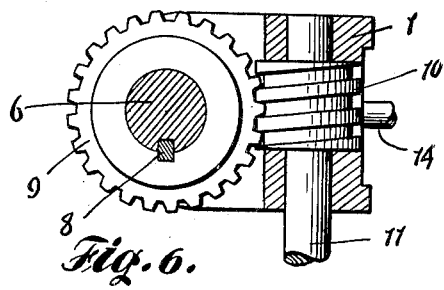
Fig. 6 is a detail plan view in cross section of the worm gear and pinion.
Figure 7:
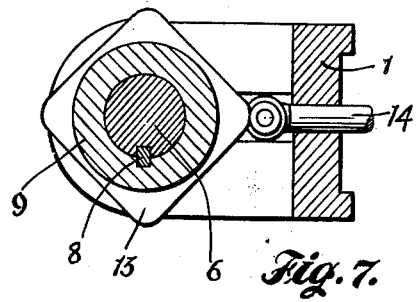
Fig. 7 is a view similar to Fig. 6 but taken on a line below the worm gear and pinion, showing the cam and rod.

Referring more particularly to the drawings, 1 represents the frame of the tool with the base 2 preferably connected by bolt 3 to and supported upon a block of cylinders 4, the bolt 3 traversing one of the cylinders. Supported in the frame 1 in the bearings 5—5 is the boring bar 6 which is slotted as at 7 to receive a key 8. The object of the key 8 is to lock the worm wheel 9 into engagement with the bar 6, this bar having a vertical movement in the frame 1. A worm 10 on a shaft 11, operated by a crank handle 12 and in mesh with the worm wheel 9, serves to rotate the bar 6. This bar, however, may be mechanically operated by substituting a pulley or belt wheel for the crank handle 12. On the lower end of the bar 6 is attached a cone-shaped device 6$^a$ for alining the bar with the center of a cylinder. Situated on the bar 6 below the worm wheel 9 is a cam 13 co-acting with a rod 14, lever 15, and a push rod 16, the lever 15 pivoted to a fulcrum 15$^a$. The push rod 16 in connection with a ratchet dog 21 engages a ratchet wheel 17, the bar 6 being screw-threaded to receive the ratchet wheel. The push rod 16 is adjustable, such adjustment being secured by a set screw 18 for adjusting the length of the stroke or time of engagement with the ratchet wheel 17. A spring 19 serves to retract the lever 15 and another spring 20 retracts the push rod 16. This spring 20 is carried in the body of a ratchet dog 21 and rests against the push rod 16, the rod and ratchet dog sliding in the small tubular piece 22.

The ratchet wheel 17, as will be noted by reference to Figs. 4 and 5, is constructed in two portions 17$^a$ and 17$^b$, so that the wheel may be removed when it is desired to slide the bar 6 backward and forward through the bearings. A semi-circular spring 23 holds the two halves or portions of the wheel in position on the bar 6.

Figure 8:
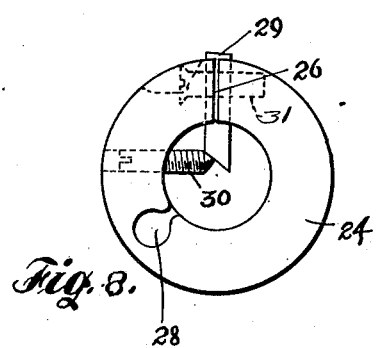
Figs. 8 and 9 are, respectively, a bottom view and a side view of the cutter head.
Figure 9:
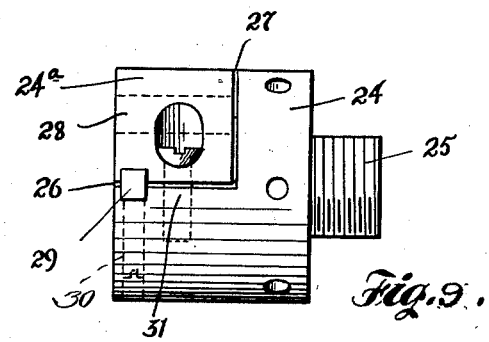

A cutter head 24, see Figs. 10 and 11, is adapted to be attached to the lower end of the boring bar 6. This cutter head is for making the first boring operation, or where a rough bore is desired, after which a reamer head, see Figs. 8 and 9 (which will be explained later) is used to make a smooth finish.

The cutter head 24 has its inner end 25 screw-threaded for attaching to the end of the boring bar 6 and has also a longitudinal slit 26 and a transverse slit 27 so that the portion 24ᵃ may have sufficient resiliency aided by the recess 28 for expansion or retraction. A cutter 29 and adjusting screw 30 are carried by the cutter head 28 and a screw 31 serves to hold the portion 24ᵃ to the main part 24, thus securing the cutter 29 in place.

In operation, turning the shaft 11 will rotate, through the worm 10 and worm wheel 9, the shaft 6, the cam 13 revolving therewith and pushing the rod 14 outward against the lever 15, which, in turn, forces the push rod 16 and the ratchet dog 21, at intervals, into engagement with the ratchet wheel 17. Thus when the ratchet wheel 17 and dog 21 are in engagement the bar 6 is free to move downward, but when the ratchet is released by operation of the cam, the bar 6 will then rotate in a stationary position allowing the reamer head to make a smooth finishing cut in the cylinder. When, however, only a rough cut is desired, the set screw 18 is lengthened to keep the ratchet wheel 17 stationary and allowing the bar 6 to feed through ratchet wheel direct at 16 threads per inch. When at the end of the cut the ratchet wheel is disconnected from the bar 6, allowing the bar to slide freely through its bearings.

Having thus described the nature and objects of my invention, what I claim as new and desire to secure by Letters Patent is:

A tool for boring automobile engine cylinders and the like, comprising a boring bar, a worm and a worm wheel for rotating the bar, a cam and a pivoted lever coacting with a ratchet wheel, said ratchet wheel removably connected to the bar, a rod at each end of the pivoted lever, the upper rod coacting with said cam and the lower rod operatively connected to a ratchet dog and said dog coacting with the ratchet, whereby the ratchet wheel, dog and pivoted lever, in conjunction with the cam and upper and lower rods will alternately stop and release the ratchet wheel and govern the vertical feeding movement of the boring bar.

In testimony whereof I have signed my name to this specification.

GEO. REESE ADAMS.